United States Patent [19]

Palfreyman

[11] Patent Number: 5,121,561
[45] Date of Patent: Jun. 16, 1992

[54] LOAD REDUCING AND ALIGNMENT SYSTEM FOR DRAG LINE EXCAVATORS

[75] Inventor: John Palfreyman, Richmond, Tex.
[73] Assignee: Warren Fabricating Corp., Yo., Ohio
[21] Appl. No.: 769,728
[22] Filed: Oct. 2, 1991
[51] Int. Cl.$^5$ .............................................. E02F 9/12
[52] U.S. Cl. ..................................... 37/116; 212/245; 212/253; 384/593
[58] Field of Search ............... 37/115, 116, 117, 135; 212/245, 253; 384/591, 592, 593

[56] References Cited

U.S. PATENT DOCUMENTS

| | | | |
|---|---|---|---|
| 133,388 | 11/1872 | Snyder | 384/591 |
| 350,528 | 10/1886 | Cooper | 384/591 |
| 4,239,305 | 12/1980 | Baron | 384/593 |
| 4,329,795 | 5/1982 | Kalve | 37/116 |
| 4,478,340 | 10/1984 | Delago | 212/253 |
| 4,611,440 | 9/1986 | Kalve | 212/253 X |
| 4,769,932 | 9/1988 | Kalve | 37/115 |
| 5,078,285 | 1/1992 | Geyer et al. | 212/253 X |

Primary Examiner—Randolph A. Reese
Assistant Examiner—Arlen L. Olsen
Attorney, Agent, or Firm—Harpman & Harpman

[57] ABSTRACT

A load reduction and alignment system for drag line excavators which have annular rail tracks on which multiple support roller assemblies are positioned. The load stress from the excavator is distributed and reduced by increasing the number of rollers within the roller assembly by reducing roller spacing as well as providing for on site adjustement of a segmented concentric guide rail against which the modified rollers engage.

4 Claims, 2 Drawing Sheets

LOAD REDUCING AND ALIGNMENT SYSTEM FOR DRAG LINE EXCAVATORS

BACKGROUND OF THE INVENTION

1. Technical Field

This invention relates to support systems for walking drag line equipment that is used in large scale removal of over burden in the strip mining industry. The walking drag line machines incur high loads and stress factors during operation which require massive support frames which are subject to extreme strain and stress concentrations through the frame. A precisely aligned roller assembly is required for movement of the drag line equipment on its base while transferring the load to the massive sub-frame. Reduction of the load from the roller assembly therefore reduces the applied stress in the frame below the roller assembly. A high wear factor is generated to the roller assembly and precise adjustment is required to offset the wear incurred during operation. It is critical to maintain a high degree of alignment in the roller assembly and associated tracks to maintain equal load factors given the massiveness of the load during operation. Down time for repair or adjustment is critical and heretofore required drag line equipment to be disassembled so that rollers could be replaced and the tracks realigned. An onside adjustment without excessive down time is highly desirable.

2. Description of Prior Art

Prior art of this type have attempted to reduce load and associated stress by a variety of different apparatus directed towards reconfiguration of the base frame, roller placement and design, see for example U.S. Pat. Nos. 4,769,932, 4,611,440, 4,329,795 and U.S. Pat. No. 4,478,430.

In U.S. Pat. No. 4,769,932 a drag line excavator frame is disclosed having torsion resistant tubular web rail girders. A reinforcing grid of the frame structure is formed of a series of vertical tubular rail girders disposed to mutually share the loading force of the drag line excavator.

U.S. Pat. No. 4,611,440 discloses a drag line base frame construction formed of cell plates that are oriented in a circular spiral arc arrangement. The arcuate arrangement is claimed to diminish stress by distributing of the load forces throughout the cell plates.

Pat. No. 4,329,795 is directed to a load stress relief construction for walking drag line excavator base frames. The base frame is so configured to have an annular area contiguous to the perimeter of the base having a greater resilient flexibility than the surrounding frame elements.

Finally, in U.S. Pat. No. 4,478,340 a quick removal system for swing bearings is disclosed for a crane construction. A retainer ring assembly made up of multiple ring elements is registerably positioned within a groove formed between and by oppositely disposed pairs of upper and lower mounting rings. The retaining ring can be easily removed to assist in disassembly and access alignment of the outer frictional bearing typified in such a rotatable support structure.

SUMMARY OF THE INVENTION

A load reducing assembly on walking drag line excavators in which additional support rollers are added to the roller assembly. An inplace on cite adjustable guide rail maintains critical annular alignment of the roller support assembly by segmented adjustable sections which compensate for roller assembly wear inherent to such assemblies.

DESCRIPTION OF THE PREFERRED EMBODIMENT

Figure 4:
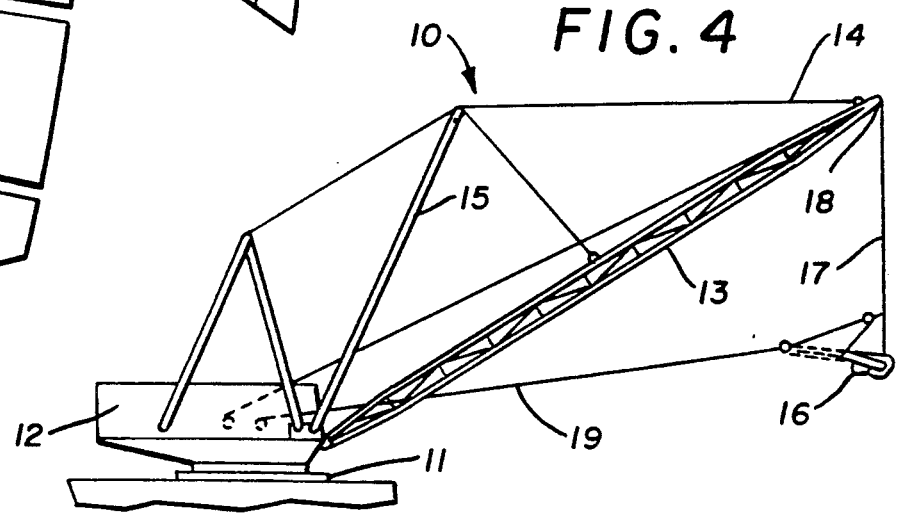
FIG. 4 is a side plan view of the walking drag line excavator.

A walking drag line excavator 10 schematically illustrated in FIG. 4 of the drawings has a base frame 11 with a revolving counter-weighted frame 12. A boom 13 extends from said frame 12 supported by a cable system 14 extending over and from multiple masts 15. A bucket 16 is extended from a hoisting cable 17 over a pulley assembly 18 on the boom 13. A drag line 19 extends from the excavator 10 to the bucket 16 all of which such construction and assembly is well known and understood to those within the art.

Figure 1:
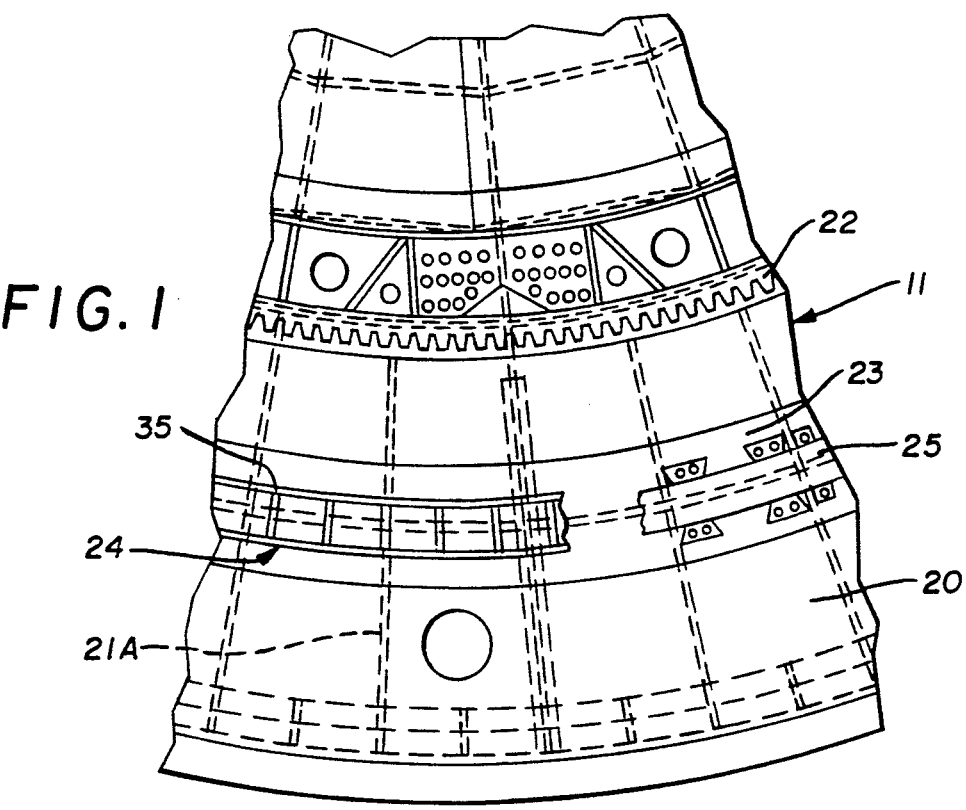
FIG. 1 is an enlarged top plan view of a fragmented portion of a support base on a drag line excavator.

The base frame 11, as best seen in FIG. 1 of the drawings, is generally comprised of top and bottom plates 20 and 21 with a plurality of spaced interconnecting support plate webs 21A defining a rigid hollow base frame construction capable of withstanding enormous implicit load and stress factors imparted thereto in operation of the drag line excavator 10.

Figure 2:
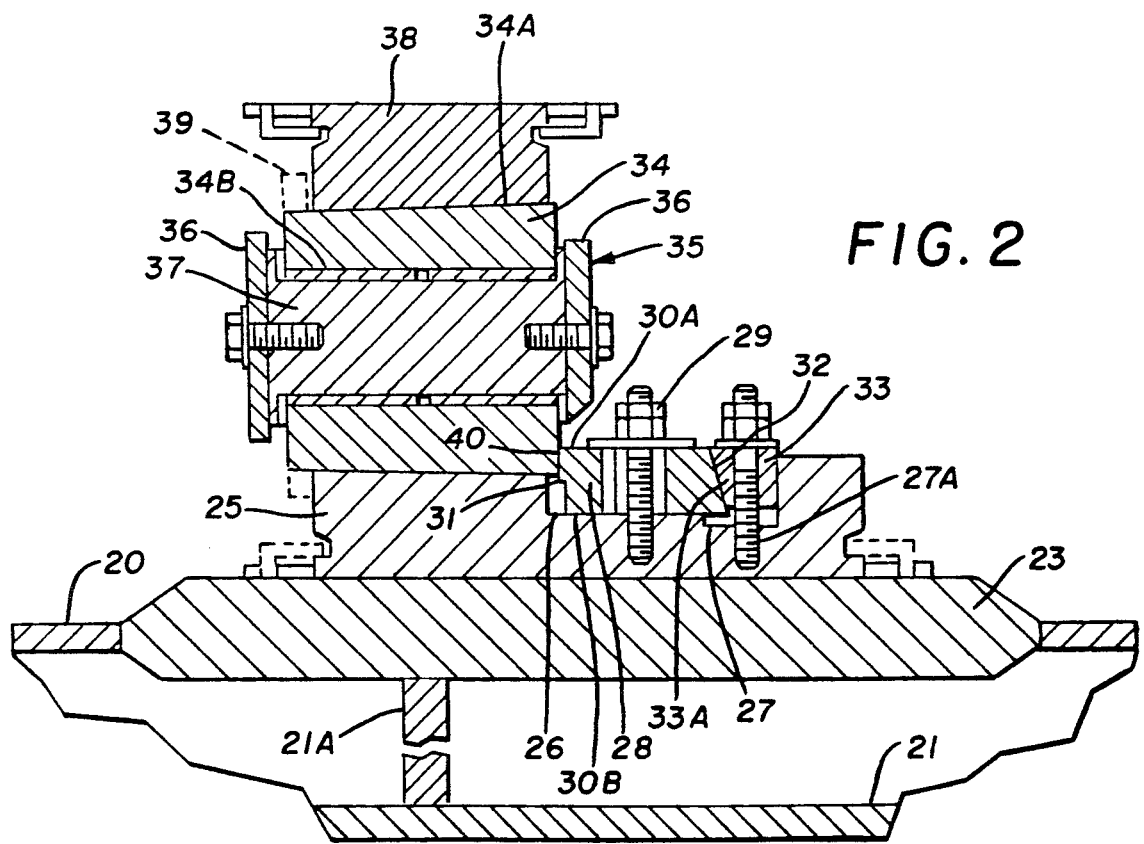
FIG. 2 is an enlarged fragmental vertical section detailed view of a roller assembly and support base.

The base frame 11 typically has an annular swing gear 22 on said top plate 20 to rotate the housing 11 and associated boom 13 and drag line equipment. An annular rail pad 23 as best seen in FIGS. 1 and 2 of the drawings is defined within the top plate 20 of the base frame 11. The rail pad 23 defines a reinforced support surface on which an annular roller support assembly 24 is positioned. An annular base rail 25 is removably positioned on said rail pad 23 and has a pair of recessed mounting areas 26 and 27 thereon. A segmented adjustable concentric engagement rail 28 is positioned within said rail mounting area 26 adjustably secured to said base rail 5 by adjustable fasteners 29. The segmented engagement rail 8 is characterized by a generally flat upper and lower surfaces 30A and 30B, a roller engagement inner surface 31 and an angularly disposed outer wedging surface 32. Adjustable wedging segments 33 are movably positioned within said recessed area 27 by fasteners 27A. Each of the wedging segments 33 has a tapered inner surface 33A in sliding wedging registration with said outer surface 32 of said concentric rail 28.

The roller support assembly 24 is comprised of multiple rollers 34 mounted within a cage assembly 35. The cage assembly 35 has oppositely disposed annular cage rings 36, a plurality of annular roller support shafts 37 and associated bearing elements and spacers as will be well known and understood to those skilled in the art. Each of said rollers 34 has a radially tapered bearing surface 34A and a central longitudinal extending mounting bore at 34B therethrough. The roller support assembly 24 is positioned between said annular base rail 25 and an upper annular engagement rail 38, best seen in FIG. 2 of the drawings. The upper annular rail 38 is removably secured to the drag line housing 11 which is typical of walking drag line excavators Each of the support rollers 34 has been modified over prior art configurations shown in broken lines in FIG. 2 of the drawings. The radial flange 39 of prior art has been removed from each of said rollers 34 in this improvement. The spaced saved by the removal of the radial flange 39 typically accounts for 15% to 20% of the overall dimension of the assembly thereby allowing for additional rollers 34 to be added to the roller support assembly 24 with a corresponding reduction i.e. dissipation of the load to the base frame 11. The roller assembly 24 must be maintained within the predetermined annular dimension and is therefore restrained and restricted by the segmented concentric rail 28 against which the rollers are engaged at 40. The segmented concentric rail 28 is of a material having a lesser hardness value than the material of the rollers 34 and will wear therefore at a faster rate than the rollers requiring periodical adjustment.

The associated wear of the segmented rail 28 is compensated for by adjustment of each of said rail segment by said respective wedging segments 33 hereinbefore described.

It will be evident from the above description that to adjust the segmented concentric rail 28 and maintain the roller assembly 24 dimensional requirements, the wedging segments 33 are advanced against said segmented concentric rail 28 by said fasteners 27A.

Figure 3:
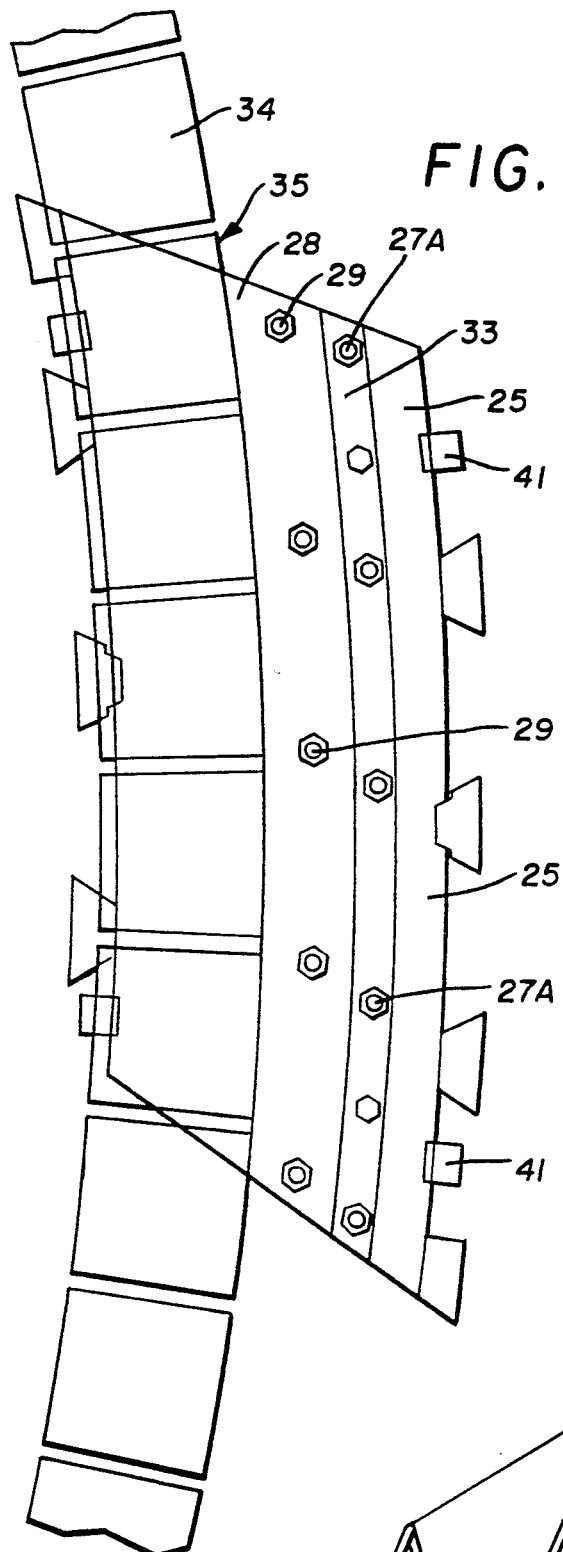
FIG. 3 is an enlarged fragmented top plan assembly view of a roller assembly and adjustment rail of the invention.

Referring now to FIG. 3 of the drawings, a typical section of the segmented elements of the adjustable concentric rail system is shown in relation to a graphic representation of the individual rollers 34. Mounting clips 41 associated with base rail 25 can be seen longitudinally spaced thereon. In the example chosen for illustration twenty-four of such segments are required to form the complete adjustable concentric rail system of the invention.

Thus, it will be seen that an improvement to a walking drag line excavator for the reduction of load and on cite alignment has been illustrated and described and that various changes and modifications may be made therein without departing from the spirit of the invention.

Therefore I claim:

1. An improvement in a walking drag line excavator having a circular load support base frame and a load support assembly for rotation of said drag line excavator on said base frame, the improvement comprising a base rail and an upper rail, an adjustable segmented concentric rail positioned on said base frame, a plurality of adjustable wedging segments registerable with said segmented concentric rail, means for adjustably securing said segmented concentric rail and said wedging segments to said base rail, a roller assembly engageable between said base rail and said upper rail, said roller assembly having a plurality of rollers mounted therein, each of said rollers having a tapered bearing surface engageable with said base and upper rail assemblies, said segmented concentric rail engaging a portion of said rollers adjacent said base rail.

2. The improvement in a walking drag line excavator of claim 1 wherein said means for adjustably securing said segmented concentric rail and said wedging segments comprise recessed mounting area in said base rails and adjustable fasteners extending from said base rails through said respective segmented concentric rail and wedging segments.

3. The improvement in a walking drag line excavator of claim 1 wherein said base rail is removably positioned on a rail pad within said base frame.

4. The improvement in a walking drag line excavator of claim 1 wherein multiple annular aligned base rail, concentric rail and wedging segments comprise an adjustable concentric rail system.

* * * * *